(No Model.)
M. G. KELLOGG.
MULTIPLE SWITCHBOARD.
No. 592,329. Patented Oct. 26, 1897.
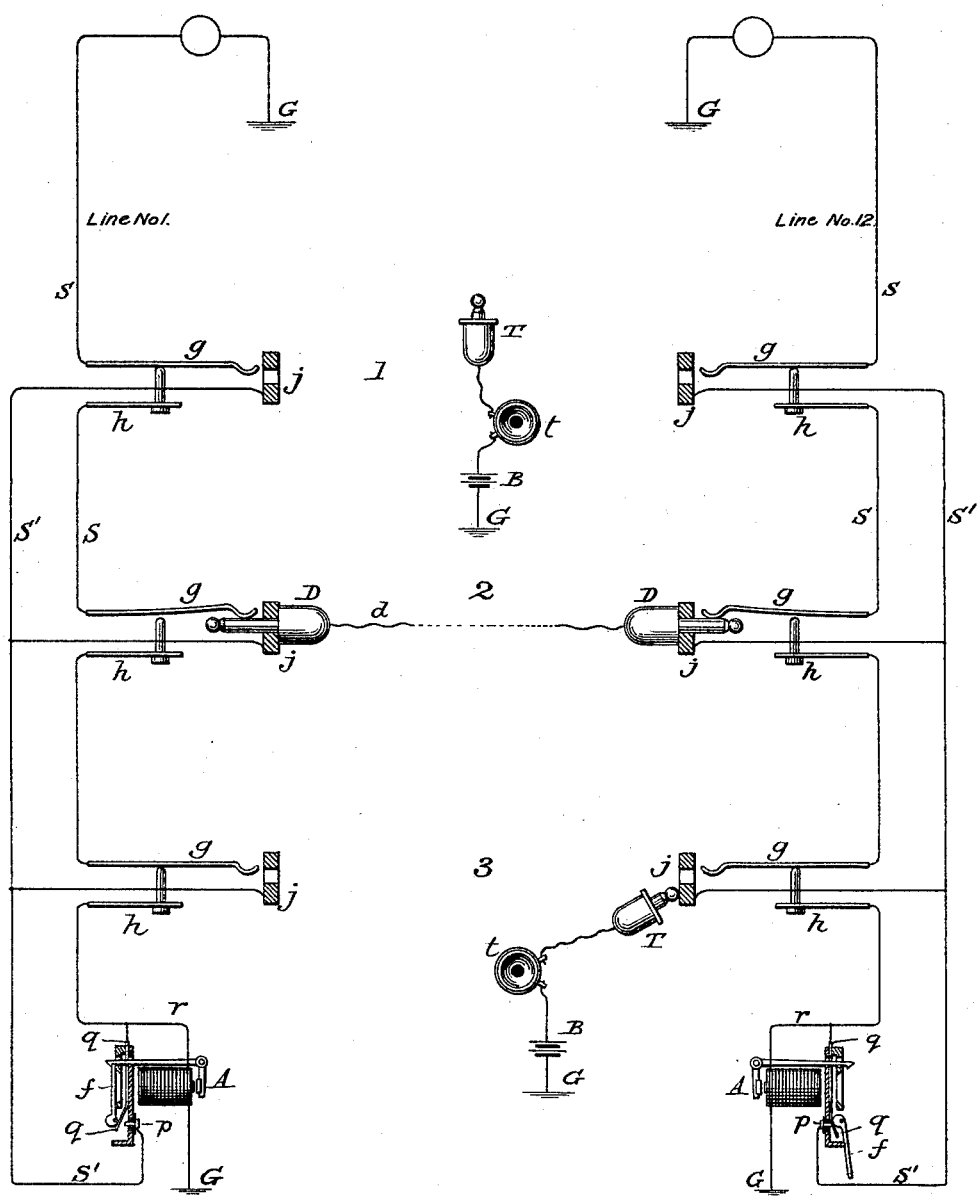
Witnesses,
Inventor,
MILO G. KELLOGG
by his attorneys

UNITED STATES PATENT OFFICE.

MILO G. KELLOGG, OF CHICAGO, ILLINOIS, ASSIGNOR TO THE KELLOGG SWITCHBOARD AND SUPPLY COMPANY, OF SAME PLACE.

MULTIPLE SWITCHBOARD.

SPECIFICATION forming part of Letters Patent No. 592,329, dated October 26, 1897.

Application filed December 11, 1889. Serial No. 333,342. (No model.)

*To all whom it may concern:*

Be it known that I, MILO G. KELLOGG, of Chicago, Illinois, temporarily residing at Stuttgart, in the Empire of Germany, have invented certain new and useful Improvements in Multiple Switchboards for Telephone-Exchanges, of which the following is a full, clear, concise, and exact description, reference being had to the accompanying drawing, forming a part of this specification.

My invention relates especially to and is an improvement on the system of multiple-switchboard testing patented by Charles E. Scribner, Patent No. 305,021, dated September 9, 1884. In said patent the test merely indicates whether or not the line tested is switched at another board. In said system, however, the operator to whom certain lines are assigned to answer may receive several annunciator-calls at practically the same moment and it may be some time before she can switch to a certain line on which a call is indicated and answer it. In the meantime another operator may test the line, and finding it to test "free" may switch it with another line and cause annoyance and confusion to the subscriber. In my invention this trouble is obviated, because as soon as the annunciator-drop falls, indicating a call, and so long as the drop remains down the line will test "busy" whether or not it is switched at any board.

In the drawing the figure shows the apparatus, circuits, and connections illustrating my invention.

It will be noticed that each subscriber's line is grounded at the subscriber's station and comprises a line conductor S to central, pairs of contacts $g\ h$ in the spring-jack at each of three boards—board 1, board 2, and board 3. From this point the line conductor has two branches, branch $r$, containing a coil of the annunciator A and grounded at G, and branch S′, containing normally open contacts $q\ p$ and terminating in test-contacts $j$ in the jack at each board. The annunciator A is so constructed that when its armature is attracted in response to a subscriber's call the flap $f$ falls and by means of its cam-shaped base closes the spring-contact $q$ upon the contact-point $p$, closing the test-circuit S′ to the line-circuit S. At board 2 are shown two connecting-plugs D, connected together by a flexible conducting-cord $d$.

The operator's outfit is not shown, but is introduced into the circuit when the line is broken. This outfit is of the usual character and need not be shown.

When the plug D is inserted into a spring-jack, it crosses contacts $g$ and $j$ of the jack, at the same time lifting the contact-spring $g$ from its anvil-contact $h$.

The crossing of contacts $g$ and $j$ maintains the connection between the test-circuit S′ and the line-circuit S, while the annunciator is disconnected from the line-circuit by the opening of the contacts $g$ and $h$. At each board is provided a test outfit for the operator at that board, comprising a test-plug T, a telephone or other test receiving instrument $t$, and a test-battery B, all grounded at G. These test outfits are shown at boards 1 and 3.

At board 3 the operator is testing line No. 12 to determine its condition. If the line was free, the contacts $q\ p$ would be open and the test-contacts $j$ would nowhere be connected to the contact-springs $g$. Under such conditions the test-circuit would be open at these contacts, and the telephone would fail to respond. If, however, the annunciator has been operated and the contacts $p$ and $q$ are closed to each other, as shown, the following test-circuit is closed: ground at G, test-battery B, telephone $t$, test-plug T, test-contact $j$, test-wire S′, contacts $p$ and $q$, branch $r$, the coil of the annunciator A, and ground at G; also, from contacts $p$ and $q$ over line conductor S to ground at the subscriber's station. The presence of the battery in this test-circuit causes the test receiving instrument to click. If now a plug D is inserted at another board, an additional branch of the test-circuit is established, as shown, from test-contact $j$, to which the test-plug T is applied, to test-contact $j$ of the jack into which the plug is inserted, the plug D, the contact-spring $g$ of the jack, and thence over the line conductor S to ground at the subscriber's station. When two lines are connected together, the additional line forms still another branch of the test-circuit. The restoration of the flap of the calling-annunciator opens the branch $r$ of the test-circuit. When the two line-circuits No. 1 and No. 12 are connected together by the test-plugs D, the test-wires S' of both circuits are connected together by the plugs through the flexible conductor d, and each test-wire is connected to its line-circuit by the crossing of the contacts g and j. Thus it will be seen that from the moment an annunciator indicates a call until the line is free it will test "busy." When, therefore, an operator on testing hears a click in her telephone, she knows that either the line is switched at some board or that its annunciator indicates a call, and she will not interfere with it. If, however, she hears nothing on testing, she knows that the line is free, and can switch it with another line.

It is of course understood that my invention may be used with various modifications of circuits and apparatus. An independent Law calling-circuit might control the connection between the line-circuit S and the test wire or conductor S'. Metallic circuits with individual or common returns might be used instead of grounded circuits, and the test receiving instrument connected thereto instead of ground. Various three-conductor systems might also embody parts of my invention, and I desire to protect these and various other modifications.

What I claim, and desire to secure by Letters Patent, is—

1. In a telephone-exchange system, a telephone-line, a test receiving instrument connected on one side with a line in combination with a test wire or circuit normally insulated from the line, an annunciator normally in the circuit of the line with contact-points to close said test wire or circuit to the line while the annunciator indicates a call, and a test plug or device connected to the other side of said test receiving instrument and adapted, at the will of the operator, to be brought into connection with said test wire or circuit, substantially as set forth.

2. In a telephone-exchange system, a telephone-line, a test receiving instrument connected on one side with a line, in combination with a test wire or circuit normally insulated from the line, an annunciator normally in the circuit of the line with contact-points to close said test wire or circuit to the line while the annunciator indicates a call, a test plug or device connected to the other side of said instrument and adapted, at the will of the operator, to be brought into connection with said test wire or circuit, and a battery in the circuit established, substantially as set forth.

3. In a telephone-exchange system, a telephone-line, a test receiving instrument connected on one side with a line, in combination with a test wire or circuit normally insulated from the line, an electromagnet normally in the circuit of a line with contact-points to close said test wire or circuit to the line when a call is sent over the line, a test plug or device connected to the other side of said instrument and adapted, at the will of the operator, to be brought into connection with said test wire or circuit, substantially as set forth.

4. In a telephone-exchange system, a telephone-line, a test wire or circuit normally insulated from the line, in combination with an annunciator normally in the circuit of the line with contact-points to close said test wire or circuit to the line when the annunciator indicates a call, and a switch adapted to switch the line with another line, with contact-points to close said test wire or circuit to the line when the line is thereby switched, substantially as set forth.

5. In a telephone-exchange system, a telephone-line, a test wire or circuit normally insulated from the line and from a test receiving instrument, in combination with an annunciator normally in the circuit of the line, with contact-points to close said test wire or circuit to the line when the annunciator indicates a call, a switch adapted to switch the line with another line, with contact-points to close said test wire or circuit to the line when the line is thereby switched, and the test receiving instrument grounded on one side and connected on its other side to a test plug or device adapted, at the will of the operator, to be brought into connection with said test wire or circuit, substantially as set forth.

6. In a telephone-exchange system, multiple switchboards, a telephone-line, a test receiving instrument connected on one side with the line and a test wire or circuit normally insulated from said line, in combination with an annunciator normally in the circuit of the line, with contact-points to connect said test-wire to the line while the annunciator indicates a call, switches for said line, one on each board, and each adapted to switch the line with other lines and with contact-points to connect said test-wire to the line while the line is thereby switched, a test plug or device connected to the other side of said instrument and adapted, at the will of the operator, to connect with said test-wire, and a battery in the circuit thereby established, substantially as set forth.

7. In a telephone-exchange system, multiple switchboards, a telephone-line, test receiving instruments one for each board and each connected on one side with the line, and a test wire or circuit normally insulated from said line and extending to all of said boards, in combination with an electromagnet normally in the circuit of said line with contact-points to connect said test-wire to the line when a call is sent over the line, a switch at each board to switch the line with other lines, contact-points to connect said test-wire with the line while the line is thus switched, test plugs or devices, one for each instrument and connected to it on its other side adapted, at the will of the operator, to be brought into connection with said test-wire, and a battery in the circuit thereby established, substantially as set forth.

8. In a multiple-switchboard exchange, a test-circuit for a subscriber's line, comprising in the order named, a grounded subscriber's outfit, a line conductor, a pair of normally open annunciator-contacts, closed while the annunciator indicates a call, a test wire or conductor, and test-contacts, one at each of two or more boards connected to said test-wire; in combination with a test outfit at each board, grounded on one side and on the other adapted to be connected to a test-contact for testing.

9. In a multiple-switchboard exchange, a test-circuit for a subscriber's line comprising in the order named, a grounded subscriber's outfit, a line conductor, pairs of switch-contacts at each of two or more boards, normally open, but each pair closed while the line is switched at its board, one of each of which is also a test-contact or connected with a test-contact, a pair of normally open annunciator-contacts closed while the annunciator indicates a call, said pairs of switch-contacts and said pair of annunciator-contacts being in parallel circuit, a test-conductor connected to said test-contacts and to one of said annunciator-contacts; in combination with a test outfit at each board, grounded on one side and on the other adapted to be connected to a test-contact for testing.

10. In a multiple-switchboard exchange, a line-circuit, a test-conductor normally insulated therefrom, an annunciator in said line-circuit and contacts operated by said annunciator closing the test-conductor to the line-circuit while the annunciator indicates a call.

11. In a multiple-switchboard exchange, a line-circuit, a test-conductor, normally insulated therefrom but crossed therewith while the line is switched for use at a board and an annunciator with contacts closing an additional connection between said line-circuit and test-conductor while it indicates a call.

12. In a multiple-switchboard exchange, a line-circuit, a test-conductor, normally insulated therefrom, but crossed therewith while switched for use at a board, and an annunciator in said line-circuit with contacts closing an additional connection between said line-circuit and test-conductor while it indicates a call.

13. In a multiple-switchboard exchange, a telephone-line, a test-conductor associated therewith but normally disconnected therefrom, a test receiving instrument normally disconnected from said test-wire, and an annunciator with contacts controlling a connection between said line-circuit, said test-conductor, and one side of said test receiving instrument.

14. In a multiple-switchboard exchange, a telephone-line from the subscriber's station to the central office, a test-wire normally insulated therefrom, and a call-annunciator with contacts closing said test-wire to said line-circuit while said annunciator indicates a call.

15. In a multiple-switchboard exchange, a telephone-line from the subscriber's station to the central office, a test-wire, and a call-annunciator controlling a connection between said line-circuit and test-wire.

16. In a multiple-switchboard exchange, a telephone-line from the subscriber's station to the central office, a test-wire, and a call-circuit controlling a connection between said line-circuit and test-wire.

17. In a multiple-switchboard exchange, a telephone-line, a test-wire, and an annunciator in said line-circuit, controlling a connection between said line-circuit and said test-wire.

MILO G. KELLOGG.

Witnesses:
   FRANCES D. KELLOGG,
   MARGARETHA RIEHL.